United States Patent [19]

Allam et al.

[11] Patent Number: 5,081,845
[45] Date of Patent: Jan. 21, 1992

[54] INTEGRATED AIR SEPARATION PLANT - INTEGRATED GASIFICATION COMBINED CYCLE POWER GENERATOR

[75] Inventors: Rodney J. Allam, Guilford; Anthony Topham, Walton on Thames, both of England

[73] Assignee: Air Products and Chemicals, Inc., Allentown, Pa.

[21] Appl. No.: 547,570

[22] Filed: Jul. 2, 1990

[51] Int. Cl.$^5$ .................................................. F25J 3/02
[52] U.S. Cl. ............................................. 62/24; 62/38; 60/39.12
[58] Field of Search ................... 60/39.12, 648; 62/11, 62/24, 38

[56] References Cited

U.S. PATENT DOCUMENTS

| | | | |
|---|---|---|---|
| 2,520,862 | 8/1950 | Swearingen | 62/123 |
| 3,729,298 | 4/1973 | Anderson | 62/39 |
| 3,731,495 | 5/1973 | Coveney | 62/39 |
| 3,950,957 | 4/1976 | Zakon | 60/648 |
| 4,224,045 | 9/1980 | Olszewski | 62/30 |
| 4,250,704 | 2/1981 | Bruckner et al. | 60/39.12 |
| 4,382,366 | 5/1983 | Gaumer | 62/39 |
| 4,631,915 | 12/1986 | Frewer et al. | 60/39.12 |
| 4,977,745 | 12/1990 | Heichberger | 60/648 |

FOREIGN PATENT DOCUMENTS

1180904 2/1970 United Kingdom.

OTHER PUBLICATIONS

Buskies, Ulrich H. and Gwozdz, Joseph C.; "Concepts of Prenflo-Based IGCC Power Plants", Seventh EPRI Coal Gasification Contractor's Conference, Oct. 28-29, 1987, Palo-Alto, California.

*Primary Examiner*—Ronald C. Capossela
*Attorney, Agent, or Firm*—Russell L. Brewer; James C. Simmons; William F. Marsh

[57] ABSTRACT

An integrated cryogenic air separation unit power cycle system is disclosed wherein the air separation unit (ASU) is operated at elevated pressure to produce moderate pressure nitrogen. The integrated cycle combines a gasification section wherein a carbon source, e.g., coal is converted to fuel and combusted in a combustion zone. The combustion gases are supplemental with nitrogen from the air separation unit and expanded in a turbine. Air to the cryogenic air separation unit is supplied via a compressor independent of the compressor used to supply air to the combustion zone used for combusting the fuel gas generated in the gasifier system.

5 Claims, 1 Drawing Sheet

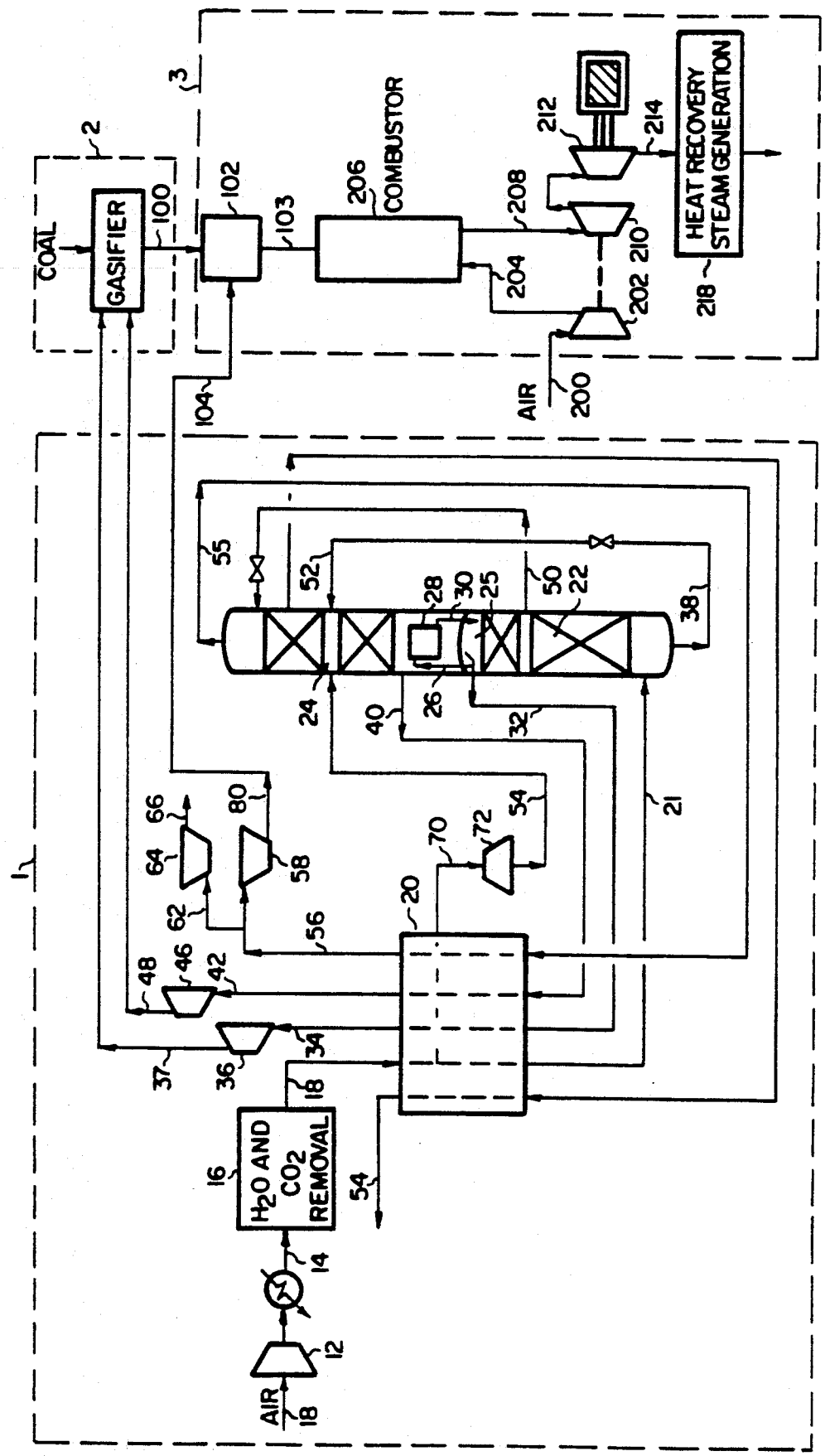

INTEGRATED AIR SEPARATION PLANT - INTEGRATED GASIFICATION COMBINED CYCLE POWER GENERATOR

TECHNICAL FIELD

In recent years electric utilities have been developing alternative technologies for power generation to meet the increased demands of society. One alternative technology that is of recent interest is referred to as the Integrated Coal Gasification Combined Cycle (IGCC). In this type of facility, coal is converted into a liquid or gaseous fuel through gasification followed by combustion and expansion of the combusted gases in a turbine. Power is recovered from the turbine. A significant advantage of an IGCC system is that capacity can be added in stages which permits incremental capital expenditures for providing the additional power demands of society. In that regard, business decisions become easier. Although the IGCC systems permits phasing in terms of providing additional capacity and makes decisions easier from a business perspective, it presents problems to the design engineer because of the inability to match performance and efficiency requirements in the IGCC system.

One of the earlier integrated IGCC systems involved a cryogenic air-separation system and power turbine and is Swearingen U.S. Pat. No. 2,520,862. The air separation unit was of common design, e.g., it employed a liquefaction and dual column distillation system with the dual column distillation system having a higher pressure and lower pressure column. Low purity, low pressure oxygen generated in the air separation unit was used for oxidizing the fuel with the resulting gases being expanded in the power turbine. To enhance efficiency of the power turbine, waste nitrogen-rich gas was taken from the higher pressure column and mixed with the compressed feed air for combustion. Two problems were presented by this approach, the first being that it was impossible to independently set the pressures of the higher pressure column with that of the inlet pressure to the turbine to achieve an optimum operating efficiency for both the air separation unit and for the power turbine and, secondly, nitrogen separation in the lower pressure column was inefficient due to the lack of nitrogen reflux available for that column.

Coveney in U.S. Pat. No. 3,731,495 disclosed an IGCC comprising an integrated air separation unit and power system wherein the cryogenic air separation unit employed a conventional double-column distillation system. In contrast to Swearingen, Coveney quenched combustion gases with a waste nitrogen-rich gas obtained from the lower-pressure column. However, in that case, it was impossible to independently control the pressure in the lower pressure column and the pressure at the inlet to the power turbine. As a result it was impossible to operate the lower pressure column and the turbine at its optimum pressures.

Olszewski, et al. in U.S. Pat. No. 4,224,045 disclosed an improved process over the Coveney and Swearingen processes wherein an air separation unit was combined with a power generating cycle. Air was compressed via a compressor with one portion being routed to the air separation unit and the other to the combustion zone. In order to nearly match the optimum operating pressures of the air separation unit with the optimum operating pressures of the power turbine cycle, waste nitrogen from the lower pressure column was boosted in pressure by means of an auxiliary compressor and then combined with the compressed feed air to the combustion unit or to an intermediate zone in the power turbine itself. Through the use of the auxiliary nitrogen compressor there was an inherent ability to boost the nitrogen pressure to the combustion zone independent of operation of the air separation unit. By this process, Olszewski was able to more nearly match the optimum pressures for the air separation unit and power turbine systems selected.

One problem associated with each of the systems described above is that even though the air separation units were integrated into an IGCC power generating system, the processes were not truly integrated in the sense that the air separation unit and IGCC power system were able to operate at their optimum pressures independent of each other. Although Olszewski reached a higher degree of independent operability than Coveney and Swearingen, the process scheme was only suited for those processes wherein air was taken from the air compression section of the gas turbine and used for the air feed to the air separation unit. The air inlet pressure to the air separation unit could be varied by using either a turbo expander on the air inlet stream or a booster compressor. Although it was possible to obtain an optimum pressure in the air separation system in the Olszewski process, for example, each prior art process received a part or all of the feed for the air separation unit from the gas turbine compressor section. However, the inlet pressure to the Olszewski air separation unit required a lower-pressure rectification stage having a pressure of at least 20 psi lower than the optimum ignition pressure in the combustion zone. In many cases enhanced operating efficiencies of the lower pressure column in the air separation unit may require a higher operating pressure than available in Olszewski, et al., particularly when moderate pressure nitrogen is desired.

SUMMARY OF THE INVENTION

This invention pertains to an improved integrated gasification combined cycle for power generation. The integrated gasification combined cycle power generation system incorporating an air separation unit, a gasification system for partial oxidation of a carbon containing fuel to produce a fuel gas and a gas turbine combined cycle power generation system which comprises a) independently compressing feed air to the air separation unit to pressures of from 8 to 20 bar;

b) cryogenically separating the air in a process having at least one distillation column operating at pressures of between 9 and 20 bar;

c) producing a lower purity oxygen stream and utilizing at least a portion of such oxygen stream for effecting gasification of a fuel;

d) generating a fuel gas in from a carbon containing fuel source by partial oxidation;

e) removing nitrogen gas from the air separation unit and boosting the pressure of at least a portion thereof to a pressure substantially equal to that of the fuel gas stream onto a pressure for introduction to the gas turbine between its compressor discharge and expander inlet; and f) expanding at least another portion of the balance of the nitrogen rich gas stream in an expansion engine and obtaining either shaft power or refrigeration or both.

It is an object of the invention to provide an arrangement for the integration of an air separation unit with an integrated gasification combined cycle power generation system such that the optimum pressure and hence efficiency can be achieved for both the air separation unit and the gas turbine system by using a stand-alone air compressor for the air separation system while feeding compressed nitrogen from the low pressure column of the air separation unit into the gas turbine between the gas turbine compressor discharge and the expander inlet, or mixing it with the fuel gas entering the combustion chamber or by a combination of these routes. Another object is to employ an air separation unit design in which air is compressed to an elevated pressure of between 8 to 20 bar abs and substantially all of the air is separated into oxygen and nitrogen which are fed to the gasifier gas turbine auxilliary expander on the ASU or are used internally in the ASU.

THE DRAWINGS

The drawing is a schematic flow sheet of an integrated air separation unit for generating high pressure, low-purity oxygen for use in an integrated gasification combined cycle for generating power and for generating a moderate pressure nitrogen product stream.

DETAILED DESCRIPTION OF THE INVENTION

Referring to the drawing an air separation unit defined within the boundaries of Box 1 is described as follows:

The air separation unit generally comprises a single column or double column distillation system with a high pressure column linked at its top end in heat exchange relationship via a reboiler condenser with a low pressure distillation column. The important feature of the air separation unit is that it operates at an elevated air inlet pressure of 8 to 20 bar absolute, giving optimum separation in a simple double column for the production of low purity oxygen in the range of 85 to 98% oxygen with substantially all of the feed air being separated into an oxygen product stream and nitrogen product stream at elevated pressure.

A feed air stream is fed via line 10 to a main air compressor 12 and compressed to pressures of from about 8 to 20 bar. Typically, the pressure will range from 9 to 14 bar. After compression, the feed air stream is aftercooled, usually with an air cooler or water cooler, removed via line 14, and then processed in contaminant removal unit 16 for the purpose of removing any contaminants which would freeze at cryogenic temperatures. Typically, the contaminant removal unit 16 will comprise an adsorption mole sieve bed for removing water and carbon dioxide although other means for removing such contaminants may be utilized. The compressed, water and carbon dioxide free air is then fed to a main heat exchanger 20 via line 18 where it is cooled to near its dew point. The cooled feed air stream is then removed via line 21 and fed to the bottom of a double column distillation system comprising a high pressure column 22 and a low pressure column 24 for separation of the feed air into a nitrogen overhead stream and an oxygen-enriched bottoms liquid.

High pressure column 22 operates within a pressure range from 8 to 20 bar, preferably from 9 to 14 bar. A crude liquid oxygen stream is obtained as a bottoms and nitrogen vapor is obtained as an overhead. The nitrogen overhead obtained at the top of high pressure column 22 is conveyed via line 25 and split into two substreams. The first substream is fed via line 26 to reboiler/condenser 28 located in the bottom portion of the low pressure column 24 wherein it is liquefied and then returned to the top of high pressure column 22 via line 30 to provide reflux for the high pressure column. The second substream is removed from high pressure column 22 via line 32 warmed in main exchanger 20 to provide refrigeration and removed from the process as a gaseous nitrogen stream (GAN) via line 34. This high pressure nitrogen stream then is boosted in pressure through the use of compressor 36 and passed via line 37 for addition to a gasifier unit to be described.

An oxygen-enriched liquid is removed from the bottom of high pressure column 22 via line 38, reduced in pressure and charged to low pressure column 24. A vaporized oxygen-enriched waste stream is removed from the overhead of the sump area surrounding reboiler/condenser 28 via line 40 wherein it is warmed in main heat exchanger 20 and removed via line 42. The resultant oxygen vapor in line 42 is compressed in auxiliary compressor 46 and delivered via line 48 for effecting gasification of a carbon containing fuel source such as pulverized coal in the gasifier to be described.

With an air inlet pressure to the high pressure column of from 8 to 20 bar, the low pressure column will operate at pressures from 2 to 8 bar. These pressures give efficient separation of air in the low pressure column to produce oxygen at from 85 to 98% purity, and preferably from 93% to 98% purity, while allowing the production of nitrogen product stream having low oxygen content of from 0.1 to 2% oxygen and preferably from 0.1 to 1% oxygen. All streams leave the cold box at elevated pressure. Reflux to low pressure column 24 is provided by withdrawing a nitrogen-rich stream from an intermediate point in high pressure column 22 via line 50, expanding that high pressure nitrogen fraction and then introducing that fraction near the top of low pressure column 24.

A nitrogen stream is removed from the top of low pressure column 24 via line 55 and warmed. The warmed nitrogen stream in line 56 is split into two portions. One portion is introduced into the gas turbine between the gas turbine compressor outlet, and the expander inlet or into the fuel stream in order to maximize the flowrate of gases entering the expander section of the gas turbine subject to design limitations. The use of injected nitrogen further acts to reduce $NO_x$ formation by reducing adiabatic flame temperatures. The use of nitrogen addition ensures maximum overall power production efficiency and is superior to the inherent practice of injecting water into the system to suppress $NO_x$ formation and maximize power output. Discharge pressures of compressor 58 range from 10 to 30 psia. At least a portion, but generally the balance of the nitrogen stream, is removed via line 62, heated using available heat energy, and expanded in an expansion engine 64 for obtaining additional shaft power. The exhaust is removed via line 66. Alternatively, this nitrogen stream can be passed through an additional cold expander within the ASU to produce refrigeration for LOX/LIN production. Refrigeration for the air separation unit is supplied by splitting the feed air into two parts with one part in line 21 going to the distillation system as described. The other part in line 70 is expanded in expansion engine 72 and the expanded gas removed via line 54 and introduced to low pressure column 24.

The gasifier section is generally defined within Box 2. Gasification of coal or other fuel to produce fuel gas is well known and any of these processes can be used. In a coal gasification process, for example, coal is pulverized and mixed with high pressure oxygen and high pressure nitrogen at high temperatures and converted to a gaseous fuel. Any solid residue from the gasifier generally is removed as slag (not shown). A fuel gas is generated in the gasifier unit and is removed via line 100. From there it is passed to mixing unit 102 wherein it is mixed with high pressure nitrogen being introduced through line 104. The resulting mixture then is ready for combustion. The addition of nitrogen at this point effects dilution of the fuel gas to reduce combustion temperatures and reduce $NO_x$ formation. Optionally, the nitrogen or portion thereof could have been introduced to the power turbine. This routing is simply a matter of choice.

The power cycle is described in the area defined as Box 3. Air is introduced via line 200 to compressor 202 and compressed to a pressure of from 7 to 25 bar. This compressed air is removed via line 204 and sent to a combustion chamber or combustion zone 206 wherein the air is contacted with the fuel mixture generated in mixing zone 102 and the mixture is ignited. Hot gases are removed from combustion zone 206 via line 208 wherein the gases are expanded in a dual expansion engine consisting of expanders 210 and 212. Expanded gases are then removed via line 214 wherein the residual heat is recovered in a heat recovery stream generation scheme comprising waste heat boiler 216. The heat recovered from waste heat boiler 216 can be used to generate high and low pressure steam and used to generate power in conventional steam turbine systems (not shown).

The above integrated air separation unit-IGCC power cycle through the independent compressor systems for providing air to the air separation unit and to the combustion chamber permits the selection of operating pressures which are optimum for both the air separation unit and combustion processes. In addition the quantities of air introduced to each unit can be more closely controlled to match nitrogen and oxygen requirements, whereas in the past a portion or all of the feed air to the air separation unit was supplied by the compressor system for the combustion chamber. The inlet air to each system was at equal pressures. Not only does this limit the air volume control, but also the pressure by this combined system. In some cases where there was insufficient nitrogen available for providing optimum flow rates in the gas turbine and water was added which reduces efficiency.

The following examples are provided to illustrate preferred embodiments of the invention and are not intended to restrict the scope thereof.

EXAMPLE 1

An air separation unit-LGCC was constructed in accordance with the drawing. Table 1 provides stream flowrates and properties.

TABLE 1

| STREAM NO. | FLOW LBMOL/HR | PRESSURE BAR | TEMP DEG F. | COMPOSITION % OXYGEN |
|---|---|---|---|---|
| 10 | 16060 | 1.01 | 60 | 21 |
| 18 | 15739 | 11.7 | 75 | 21 |
| 37 | 1110 | 10.9 | 65 | 0.5 |
| 42 | 3432 | 3.5 | 65 | 95 |

TABLE 1-continued

| STREAM NO. | FLOW LBMOL/HR | PRESSURE BAR | TEMP DEG F. | COMPOSITION % OXYGEN |
|---|---|---|---|---|
| 48 | 3432 | 3.5 | 90 | 95 |
| 56 | 11048 | 3.4 | 65 | 98 |
| 60 | 5334 | 18.4 | 446 | 98 |
| 62 | 5714 | 3.4 | 218 | 98 |
| 100 | 12698 | 18.4 | 570 | |
| 200 | 100000 | 1.01 | 60 | 21 |
| 204 | 100000 | 14.4 | 724 | 21 |
| 208 | 112000 | 14.4 | 2200 | 13 |
| 214 | 112000 | 1.03 | 1137 | 13 |

After heating using available heat energy, i.e. heat of compression of the air compressor to the air separation unit.

| Fuel Gas Composition Percent | |
|---|---|
| Nitrogen | 1.9 |
| Argon | 1.9 |
| Carbon Monoxide | 65.0 |
| Carbon Dioxide | 1.2 |
| Hydrogen | 10 |

The following table gives a comparison between the Olszewski process, with either total air separation unit feed or partial feed from the gas turbine (GT) compressor, and the process according to the present invention, with a stand alone air compressor. Note that in each case the ratio of gas turbine expander to compressor flow is 1.12, as in Table 1. The total air bleed case uses water injection into the combustion chamber of the gas turbine to reach the required gas turbine expander flow.

TABLE 2

| Case | Power (MW) | Steam Turbine % Efficiency |
|---|---|---|
| Stand Alone ASU - Ex. I | 217.4 | 44.0 |
| Partial Air Feed From GT (no water) | 218.2 | 44.1 |
| Total Air Feed From GT (water addition) | 235 | 40.5 |

The above results show comparable results in terms of power and efficiency for the Example 1 and partial air feed from the gas turbine. However, through the independent control in the stand alone system enhanced efficiencies may be achieved at alternative separation pressures.

What is claimed:

1. An integrated gasification combined cycle power generation system comprising an air separation unit wherein air is compressed, cooled, and separated into an oxygen and nitrogen enriched fractions, a gasification system for generating a fuel gas, an air compressor system for supplying compressed air for use in combusting said fuel gas, a combustion zone for effecting combustion of said compressed air and said fuel gas, and a gas turbine for effecting the generation of power from the resulting combusted gases from said combustion zone in said combined cycle power generation system which comprises:

a) independently compressing feed air to the air separation unit to pressures of from 8 to 20 bar from the compressor system used to compress air for said combustion zone;

b) cyrogenically separating the air in said air separation unit having at least one distillation column operating at pressures of between 8 and 20 bar and producing an oxygen enriched fraction consisting of low purity oxygen, and;

c) utilizing at least a portion of said low purity oxygen for effecting gasification of a carbon containing fuel source by partial oxidation in said gasification system and thereby generating a fuel gas stream;

e) removing at least a portion of a nitrogen enriched fraction from said air separation unit and boosting its pressure to a pressure substantially equal to that of the fuel gas stream; and f) expanding at least another portion of the nitrogen enriched fraction in an expansion engine.

2. The process of claim 1 wherein the nitrogen enriched fraction which has been boosted for pressure in step (e) is introduced to the combustion zone.

3. The process of claim 2 wherein the column is operated at a pressure from 9 to 14 bars.

4. The process of claim 3 wherein the inlet pressure to the high pressure column is within a range of from 10 to 14 bar.

5. An improved integrated combined cycle process incorporating an air separation unit (ASU) and expansion engine which comprises the following steps:

(a) compressing feed air to between 8 bar abs and 20 bar abs in a stand-alone air compressor;

(b) cooling the compressed air to a reduced temperature;

(c) introducing the cooled air to a higher pressure column in a double-distillation system with the upper end of the higher pressure column in heat exchange relationship via a reboiler/condenser with the bottom portion of a lower pressure distillation column;

(d) condensing and separating the cooled air into an oxygen-enriched liquid and a nitrogen-enriched liquid in the higher pressure column;

(e) transferring at least a part of the oxygen and nitrogen enriched liquid produced in step (d) to the lower pressure distillation column operating at a pressure from 2 to 8 bars for separation into low purity oxygen and nitrogen-rich gases;

(f) removing a low-purity oxygen stream from the lower pressure column and utilizing at least a portion of such low purity oxygen stream for effecting gasification of a fuel and thereby generating a combustion stream comprised of gases from a carbon containing fuel source for combustion in a combustion zone;

(g) removing the nitrogen-rich gas stream from said lower pressure column and boosting the pressure of at least a portion thereof to a pressure substantially equal to that of the combustion stream;

(h) expanding at least another portion of the nitrogen-rich gas stream in an expansion engine;

(i) compressing air for use in effecting combustion of the combustion stream, said compression being independent of that compression for the air separation unit;

(j) feeding said air to a combustion chamber for effecting combustion of said gases in the combustion stream generated in step (f); and then, (k) expanding the resulting gases obtained from the combustion zone in an expansion engine and recovering power therefrom.

* * * * *